United States Patent [19]
Van Handel

[11] 3,813,778
[45] June 4, 1974

[54] FLEXIBLE ARTIFICIAL DENTURE

[76] Inventor: Ambrose B. Van Handel, 8653 Louise Ave., Northridge, Calif. 91324

[22] Filed: Dec. 1, 1972

[21] Appl. No.: 311,066

[52] U.S. Cl. .................................................. 32/2
[51] Int. Cl. .......................................... A61c 13/00
[58] Field of Search ........................................ 32/2

[56] References Cited
UNITED STATES PATENTS

| | | | |
|---|---|---|---|
| 2,107,181 | 2/1938 | Guyton | 32/2 |
| 2,250,373 | 7/1941 | Hagerman | 32/2 |
| 2,641,835 | 6/1953 | Greenmun | 32/2 |
| 2,778,110 | 1/1957 | Gooris | 32/2 |

Primary Examiner—Robert Peshock
Assistant Examiner—J. O. Lever
Attorney, Agent, or Firm—Nilsson, Robbins & Berliner

[57] ABSTRACT

An artificial denture formed of a resilient base member which may or may not have a reinforcing bar encased therein. The base member secures the synthetic teeth in their respective positions. During mastication, the resilient base acts as a shock absorber of the traumatic masticating pressure by allowing a limited movement of the individual teeth in the resilient base toward the dental ridge. Because of the absorption of the shock of masticating force, the resilient denture base remains stable on the dental ridge, thereby overcoming the trauma and needless movements inherent in the hard denture base in relation to the dental ridge.

14 Claims, 10 Drawing Figures

PATENTED JUN 4 1974 3,813,778

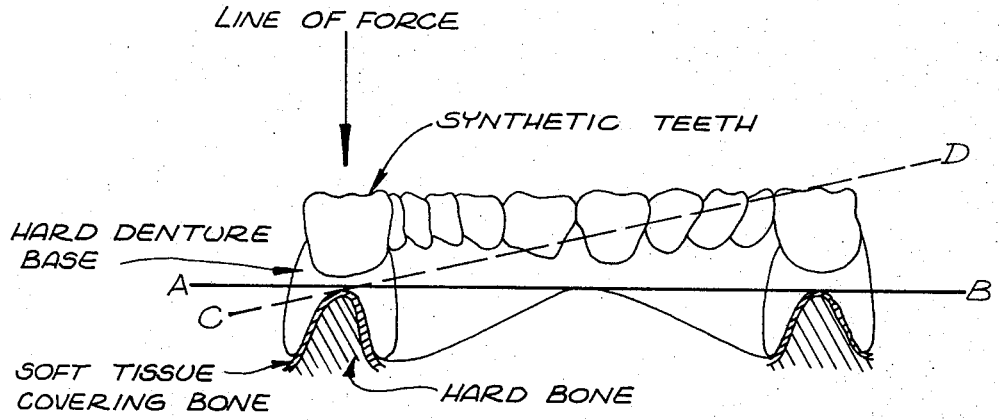
Fig. 8. CONVENTIONAL DENTURE
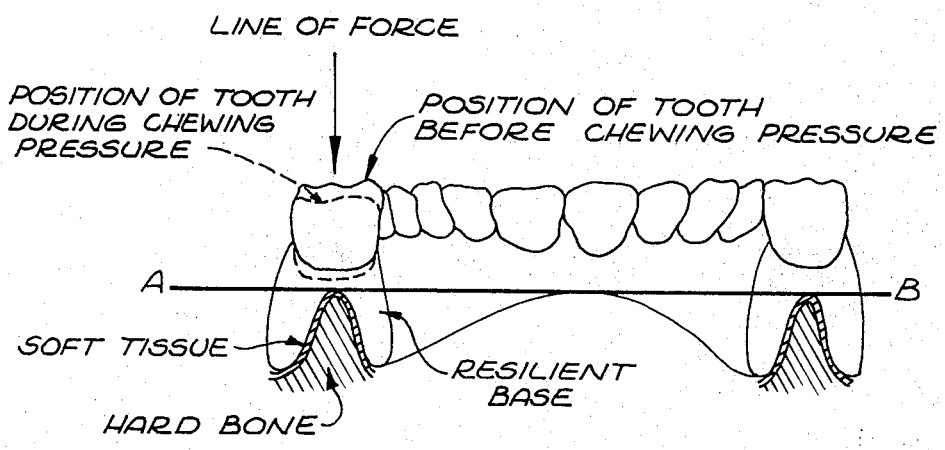
Fig. 9. FLEXIBLE DENTURE

FLEXIBLE ARTIFICIAL DENTURE

FIELD OF THE INVENTION

The field of art to which the invention pertains includes the field of artificial dentures, particularly with respect to a denture formed of a resilient base member.

BACKGROUND AND SUMMARY OF THE INVENTION

Conventional denture bases are generally formed from an acrylic resin such as methyl methacrylate resin. Such base materials are well suited for dentures in that they are hard, thus holding the artificial teeth in the desired position as well as being inert to saliva and food encountered in the human mouth. However, since dentures made from acrylic resins are relatively hard, they often cause discomfort to the wearer when pressure is applied. In normal mastication, the lower denture can move on the wearer's dental ridge as much as 2 to 4 millimeters, even though the denture fits reasonably well and the bite is balanced. Due to the movement of the denture during mastication and normal swallowing, irritations to the tissue of the wearer's dental ridge occur, causing discomfort and pain. The denture wearer finds it extremely uncomfortable to bite down on food and, therefore prefers to eat generally soft foods.

In my copending U.S. Pat. application Ser. No. 187,263, filed Oct. 7, 1971 now U.S. Pat. No. 3,785,054, there is described an artificial denture which attempts to alleviate the discomfort associated with hard denture base material by utilizing a resilient liner which is secured to the denture base adjacent to the wearer's dental ridge. While such a denture base structure helps relieve the discomfort encountered in the mastication of food and swallowing, due to the bulk of the base material in the denture being hard, the denture still moves during chewing and can therefore cause irritation with some users. To minimize the movement of the denture during masticiation, adhesives are applied to the area of the denture contacting the dental ridge. Such adhesives are messy, need frequent application and in addition, must be cleaned from the denture and the mouth.

The present invention provides a denture constructed entirely of a resilient base member which may or may not have a reinforcing bar encased therein. Due to the resilient structure of the base member, each of the synthetic teeth is movable relative to each other, thus minimizing movement of the remainder of the denture where mastication is not taking place. The resilient base denture absorbs the shock of mastication instead of transferring the shock to the dental ridge, as occurs in conventional hard denture bases. In addition, the resilient base denture transfers to the wearer a feeling of natural tissue in the mouth and a chewing action comparable to one's natural teeth.

BRIEF DESCRIPTION OF THE DRAWINGS

FIG. 8 is a cross sectional view of the lower denture made of hard base material;

FIG. 9 is a cross sectional view of the lower denture made of a resilient base.

DETAILED DESCRIPTION

As required, detailed illustrative embodiments of the invention are disclosed herein. However, it is to be understood that these embodiments merely exemplify the invention which may take forms which are different from the specific illustrated illustrative embodiments disclosed. Therefore, specific structural and functional details are not to be interpreted as limiting, but merely as a basis for the claims which define the scope of the invention. In this regard, while the full lower and upper dentures are illustrated and described hereafter, it is understood that these embodiments are shown for illustrative purposes only. The invention is also suitable for use with partial dentures.

Figure 1:
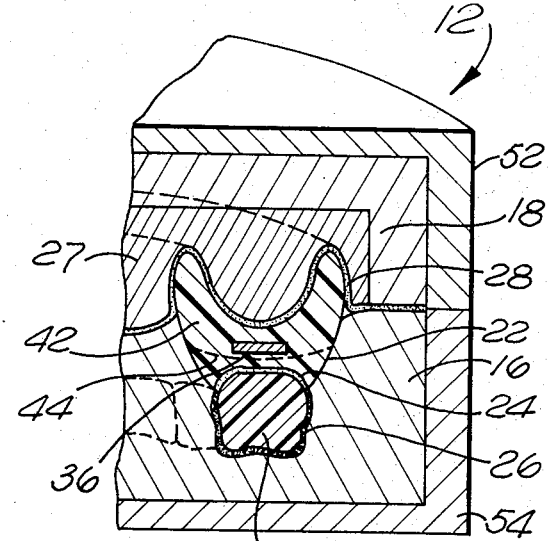
FIG. 1 is a sectional view of a portion of a dental flask with a portion of the lower denture formed of a resilient base material and embodying the present invention in a state of fabrication.

Referring to FIG. 1, a lower denture 10, made in accordance with the invention, is shown mounted in a metal flask 12. The denture 10 is a lower denture and is shown in an inverted position. Initially, the synthetic teeth 14 are set in wax on the stone models of the dental ridges while mounted on an articulator. The denture is then removed from the articulator and tested in the wearer's mouth for appearance. The denture is then removed from the articulator, invested in stone 16 and stone 18 in the upper and lower half, respectively, of the metal flask 12, and the wax boiled out. The aforementioned steps are conventional in making dentures.

To complete the lower denture 10 of FIG. 1, the teeth 14 are removed from the shown position in the stone 16 in the upper half of metal flask 12. The teeth 14 are kept in their respective positions until they have been painted with a bonding solution 24, which is applied to the area which will be covered with a resilient base material. The bonding solution normally requires about 30 minutes to set, at which time the stone 16 inside of the upper half flask 12 is painted with a liquid foil 26 and the teeth returned to their respective positions. As the liquid foil dries, the teeth are secured in position. It is recommended that the teeth 14 be removed in order to enable the liquid foil 26 to be painted on the stone 16 without touching the area of the teeth to be bonded to the resilient base material.

The lower half of metal flask 12 containing stone 18 secures a gum ridge model 27 which is painted with a liquid foil 28. Both halves of the flask containing the liquid foil are then allowed to dry.

Figure 2:
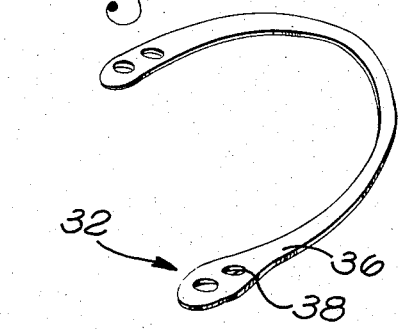
FIG. 2 is a perspective view of a metal strengthening bar which may be incorporated in the denture of FIG. 1.

Referring now to FIG. 2, a metal reinforcing bar 32 is illustrated which is contoured to fit the crest of the dental ridge. Perforations 38 may be formed at the ends of the reinforcing bar for retention purposes.

Referring again to FIG. 1, after the liquid foil on the stone 16 and the gum ridge model 27 has dried, a resilient liner material which forms the resilient denture base 42 is added, so as to cover the synthetic teeth up to approximately the dotted line 44 shown in FIG. 1. Typically, it has been found that a 1 millimeter layer of the resilient material is sufficient to cover the synthetic teeth. The metal bar 32 is then placed onto this layer of resilient material. The rest of the resilient material is then added to fill the cavity in the mold.

A material which has been used to form a resilient denture 42 with satisfactory results is Per-Fit Resilient Liner, manufactured by Dental Products Unlimited.

The lower half of flask 12 is then positioned so that both halves of the flask are closed and metal-to-metal contact occurs between the outer surfaces 52 and 54 of the flask. The flask 12 is then set in cold water and slowly brought to a boil, with three hours needed to process the denture base 42 in boiling water. After the denture base has been processed, the flask is opened, and the denture shown in FIG. 3 is removed therefrom.

Figure 3:
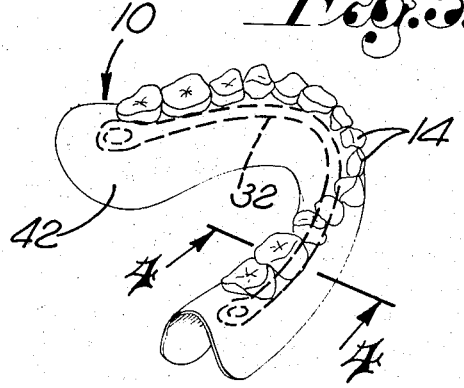
FIG. 3 is a perspective view of a lower denture formed of a resilient base material made in accordance with the principles of the invention.
Figure 4:
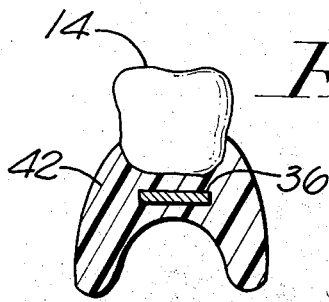
FIG. 4 is a cross sectional view of the lower denture of FIG. 3 taken along the lines 4—4 of FIG. 3.
Figure 5:
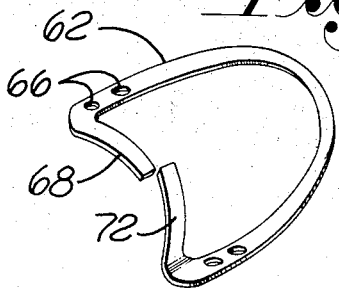
FIG. 5 is a perspective view of a metal reinforcing bar which may be used in an upper full denture.
Figure 6:
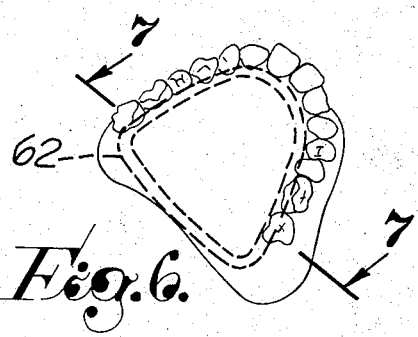
FIG. 6 is a perspective view of an upper full denture made of resilient base material in accordance with the invention.
Figure 7:
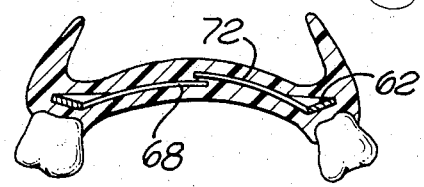
FIG. 7 is a cross sectional view of the upper denture of FIG. 6 taken along the lines 7—7.

Referring now to FIG. 5, there is illustrated a metal reinforcing bar 62 which can be used in combination with a resilient upper denture similar to the lower denture formed of the resilient base material 42 of FIG. 3. The reinforcing bar 62 may contain perforations 66 similar to that shown in the reinforcing bar 32 used with the lower denture of FIGS. 1 and 3. In addition, the upper denture reinforcing bar 62 contains extension bars 68 and 72, respectively, which extend from either end adjacent the perforations 66. As can be seen in FIG. 7, which is a cross-sectional view of the completed upper denture of FIG. 6, the extension bars 68 and 72 can be made to overlap in the upper denture, with the reinforcing bar adjusted to fit various sizes of palates. The upper denture of FIG. 6 is formed in a similar manner as the lower denture illustrated in FIGS. 1 and 3.

The lower denture reinforcing bar 32 and the upper denture reinforcing bar 62 may be made in small, medium and large sizes to accomodate various size dental arches. By molding the reinforcing bars 32 and 62 so that they are encased in the resilient base material of the upper and lower dentures, the bars are held in place.

Referring now to FIG. 8, there is illustrated a conventional hard base denture shown in cross-sectional view. Line A-B is a line angle on the cross-sectional view of the hard base lower denture as it rests on the dental ridge. Application of pressure in chewing along the line of force involves all of the working teeth on the working side moving in unison because of the non-yielding hard base material.

As the working side of the denture is forced down, it compresses the underlying soft tissue. This downward movement of the denture on the working side transfers the forces of stress to the opposite side of the denture causing a lifting or tilting motion, as illustrated by the broken line C-D. As will be noted, a slight downward movement of the denture on the working side causes an appreciable lifting or tilting action on the opposite side.

Referring now to FIG. 9, there is illustrated a resilient base denture in cross-sectional view and made in accordance with the principles of the invention. Line A-B is a line angle on the cross-sectional view of a resilient base lower denture as it rests on the dental ridge. Application of pressure in chewing along the line of force causes the individual tooth or teeth involved to be compressed into the resilient base without undue stress on the dental ridge. Because of the individual movement of the teeth involved on the working side, the absorption of the chewing force by the resilient base eliminates the stress transfer to the opposite side of the denture; therefore, the opposite side remains stable, and no tilting action is involved, as was illustrated by the broken line C-D in FIG. 8.

The conventional denture base of FIG. 8, being made of a hard material, such as acrylic, cannot allow the teeth to move individually or to allow the teeth to move into the denture base. When a force is applied, as in chewing through a bolus of food, the soft tissue is compressed on the entire side of that dental arch which is receiving the force of mastication, causing a movement of the denture toward the underlying bone. Simultaneously, the opposite side of the denture is lifted away from the dental ridge. The denture lifts more than just the distance that the side under compression moves since the opposite side of the denture moves considerably more because it is further from the fulcrum, than where pressure is applied, as illustrated in FIG. 8. In the interim, while the side opposite to the working side of the denture is lifted away from the dental ridge, food can lodge between the denture and the dental ridge.

As the teeth cut through the bolus of food and come into contact, the teeth on the opposite side of the denture arch come together and push the denture back on the ridge. This movement of the denture, with each succeeding chewing action, in addition to allowing food to lodge under the denture, traumatizes the soft tissue between the hard denture base material and the underlying bone, often causing bone resorption which increases denture movement and discomfort.

Making the denture of a flexible material is more than mere substituting the resilient material of the denture for the conventional hard material. It completely changes the denture functions in the mouth. All of the tipping or lifting movement occuring in the conventional hard denture base is greatly minimized, if not eliminated. As illustrated in FIG. 9, since the resilient base material is flexible, the individual synthetic teeth can move relative to each other, as opposed to the synthetic teeth of the conventional hard denture, which are locked into position by the hard base material, necessitating all of the teeth moving in unison. Since the denture base material is resilient, the proper amount of movement of the individual synthetic teeth during mastication occurs.

The forces of mastication when applied to the occlusal surfaces of the teeth in a resilient base transmit a different vector of force because each tooth in the arch is now capable of acting individually, and moves with the force of mastication into the resilient base, comparable to the movement of the natural dentition allowed by the peridental membrane fibers holding the natural teeth in position. The resilient denture base also provides an elastic memory, allowing the synthetic teeth to return to their former positions after the movement during mastication. Moreover, since the synthetic teeth move individually with respect to the resilient denture, mastication does not cause the denture to lift away from the dental ridge on the opposite side of the denture when mastication is occurring.

In the resilient base denture, the teeth in contact with the bolus of food move in the exact area in which the pressure is applied, whereas in the conventional hard base denture, when pressure is applied in one general area, all the teeth in that area must move in unison away from the biting pressure.

The resilient base lying between the working teeth and the bone absorbs most of the masticating force, thereby exerting much less trauma to the soft tissue and the bone than the conventional hard denture base. By the masticating force being absorbed directly by the resilient base in contact with the teeth involved in chewing the bolus of food, the resilient base does not transmit the lifting force to the opposite side of the denture, as illustrated in FIG. 9.

By absorbing the forces of mastication, the resilient base acts as a shock absorber to the underlying tissues. Being flexible, the denture tends to adhere to the dental ridges. The resilient base denture minimizes the trauma to the dental ridge, lifting of the denture during mastication, food under the denture, irritations and sore spots, and provides more comfort and stability.

Figure 10:
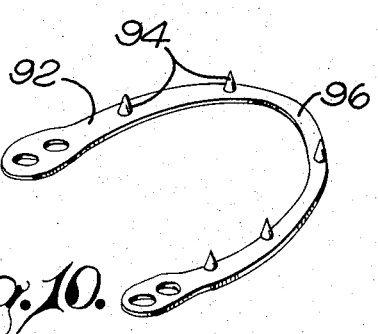
FIG. 10 is a perspective view of an alternative arrangement of the metal strengthening bar illustrated in FIG. 2.

FIG. 10 illustrates an alternative arrangement of the metal reinforcing bar illustrated in FIG. 2. In FIG. 10, the metal reinforcing bar 92 contains projections 94 which extend from the bar surface 96 and which help position the metal bar in relation to the base of the synthetic teeth. When the metal bar 92 is placed on the resilient material, the projection tip 98 of the projection touches the surface of the teeth.

I claim:

1. An artificial denture including synthetic teeth comprising:
   a base member consisting entirely of resilient material for moving said synthetic teeth along the axis of a force applied to said teeth and in a plane perpendicular to the plane of said denture, and simultaneously retaining the synthetic teeth to which a force is not applied;
   a reinforcing bar encased in said resilient base member; and
   means for securing synthetic teeth to said resilient base member.

2. An artificial denture in accordance with claim 1 wherein said reinforcing bar contains projections for positioning the synthetic teeth with respect to said metal bar.

3. An artificial denture in accordance with claim 1 wherein said reinforcing bar is positioned directly at the base of the artificial teeth.

4. An artificial denture in accordance with claim 1 wherein said synthetic teeth are mounted in said resilient base member so as to be relatively movable independent of each other.

5. An artificial denture in accordance with claim 1 wherein said reinforcing bar is adjustable to fit various sizes of palates.

6. An artificial denture in accordance with claim 5 wherein said reinforcing bar contains a pair of overlapping extension members which are movable with respect to each other prior to being encased in said resilient base member.

7. An artificial denture in accordance with claim 3 wherein said reinforcing bar contains perforations for aiding the retention of said bar in said base member.

8. An artificial denture in accordance with claim 1 wherein said synthetic teeth are mounted in said resilient base member whereby said synthetic teeth move individually and independently of each other into the resilient base member as chewing pressure is applied on them.

9. An artificial denture in accordance with claim 8 wherein said synthetic teeth are mounted in said resilient base member whereby said synthetic teeth return to their original positions after the chewing pressure is relieved, due to the elastic memory of the resilient base member.

10. An artificial denture including synthetic teeth comprising:
    a base member consisting entirely of an integral section of resilient material for moving said synthetic teeth along the axis of a force applied to said teeth and in a plane perpendicular to the plane of said denture, and simultaneously retaining the synthetic teeth to which a force is not applied;
    means for securing synthetic teeth to said resilient base member on one side thereof and the other side of the base member being shaped to position the base member adjacent the wearers gum ridge.

11. An artificial denture in accordance with claim 10 wherein said synthetic teeth are mounted in said resilient base member for enabling said synthetic teeth move individually and independently of each other into the resilient base member as chewing pressure is applied to them.

12. An artificial denture in accordance with claim 10 wherein said synthetic teeth are mounted in said resilient base member for enabling said synthetic teeth return to their original positions after the chewing pressure is relieved, due to the elastic memory of the resilient base member.

13. An artificial denture in accordance with claim 1 constructed so that said resilient base member acts as a shock absorber of chewing pressures.

14. An artificial denture in accordance with claim 10 constructed so that said resilient base member acts as a shock absorber of chewing pressures.

* * * * *